(No Model.)

C. E. BLAKE, Sr.
SURGICAL FORCEPS FOR DENTAL USE.

No. 491,464. Patented Feb. 7, 1893.

Witnesses.
H. Monteverde
Ira V. Hitchcock

Inventor
Charles E. Blake, Sr.
by Jno. L. Boone
his Attorney

UNITED STATES PATENT OFFICE.

CHARLES E. BLAKE, SR., OF SAN FRANCISCO, CALIFORNIA.

SURGICAL FORCEPS FOR DENTAL USE.

SPECIFICATION forming part of Letters Patent No. 491,464, dated February 7, 1893.

Application filed November 6, 1891. Serial No. 411,093. (No model.)

*To all whom it may concern:*

Be it known that I, CHARLES E. BLAKE, Sr., a citizen of the United States, residing at the city and county of San Francisco and State of California, have invented certain new and useful Improvements in Surgical Forceps for Dental Use; and I do hereby declare the following to be a full, clear, and exact description of said invention, such as will enable others skilled in the art to which it most nearly appertains to make, use, and practice the same.

My invention relates to a surgical instrument specially adapted to cut around the tooth or roots thereof, and separate or strip the circumjacent tissues or process, or both, at one operation, thus leaving the tooth to be easily extracted by the usual extracting instruments, without danger of mutilating the gums or breaking or tearing away of a part of the process with the tooth.

Figure 1:
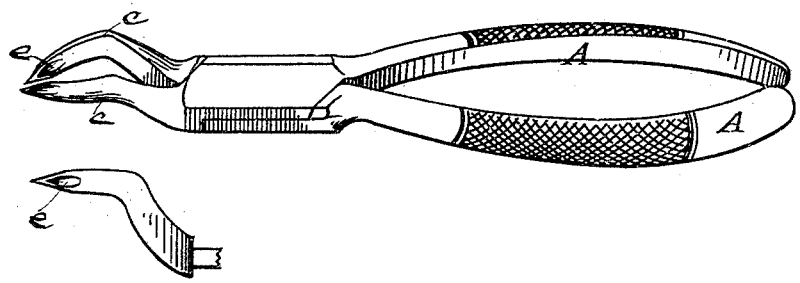
Figure 2:
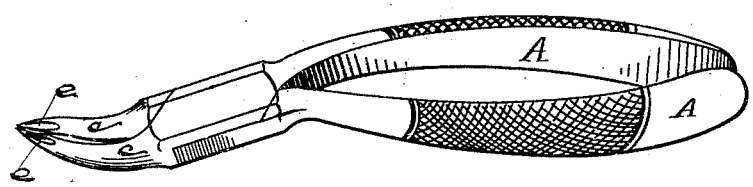

Referring to the accompanying drawings, Figure 1, represents one of my surgical instruments, having its blades adapted for cutting around a molar or back tooth; Fig. 2, represents the same, with blades adapted to cut around a bicuspid; and Fig. 3 is adapted for front or labial teeth.

The handles, A, A, are provided with blades c c, adapted to suit the particular locality of the teeth to be operated on. Therefore, in constructing the implements I make them in sets, so that each set will be formed with variously devised blades, adapted to accommodate the various conditions and circumstances arising in this class of work. The blades c, c, are curved or bent on their opposite, inner sides, so that their points meet when the handles are closed, leaving a space, between the blades, back of the points, for the reception of the tooth when the points of the blades are closed upon it. The points of these blades are tapering and have straight cutting edges, at least, at two sides, being preferably triangular in cross-section. The sides or faces of these blades are preferably concave or hollowed out, as at e, so that the blades can be more easily filed, ground or whet to give a sharp cutting edge to the extreme points of the blades, as well as to the side edges.

Now, when a tooth, root or broken fang, is to be removed from the jaw, I choose from these set of surgical instruments, the one having blades properly shaped to reach the locality, and close the points of the blades upon the tooth or upper part of the root or fang. I then press the points down, so that they follow the wall of the tooth or root, and at the same time turn the instrument, so that the sharp cutting edges will follow around the tooth or root and separate and strip the tissue and process from it. As the cutting edges of the blades follow down along the wall of the tooth or root, the gradual enlargement of the blades presses the tissue and process away from the tooth or root leaving it clear of attachment, so that the extracting instruments can be introduced and the root or fang drawn without mutilating the gums or process. The points and cutting edges should be kept sharp at all times, which is easily done with a whetstone, the concave or hollow sides of the angular point necessitating but little work to keep them sharp. This method of detaching the tissue and process from the tooth gives but little pain, as the sharp edges merely separate, without cutting the surrounding integument, and the tooth cann the be drawn without causing much pain.

Figure 3:
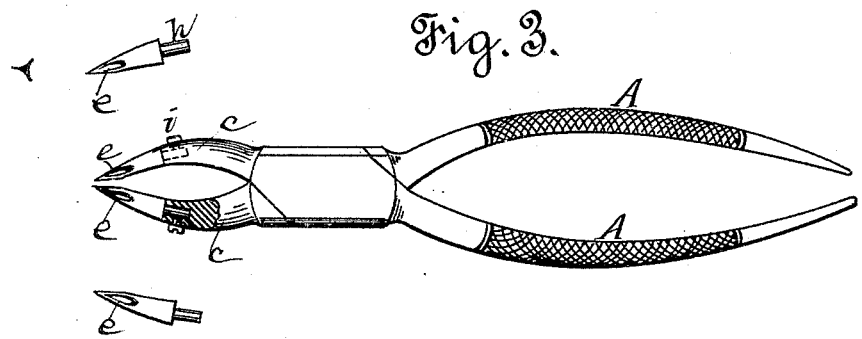

To facilitate the work of keeping the edges sharp I shall sometimes make the points removable, as shown at Figs. 1 and 3, in which case they will be provided with a shank h, which fits into a socket in the base of the blade, and is held in place by a set screw, i. In some cases I shall provide only one blade with these sharp cutting edges, while the other blade will be provided with a suitable fulcrum, around which the cutting blade will move, for instance; a simple point could be used for a fulcrum, which could be inserted into a cavity in the crown of the tooth to act as a center for the cutting blade to operate from. These matters, however, will suggest themselves to the skilled dentist, and can be variously applied.

Having thus described my invention, what I claim and desire to secure by Letters Patent is—

1. A surgical instrument for dental use, having two sharpened tapering blades, triangular in cross-section, the sides of the points being made hollow or concave and the edges sharpened, substantially as described.

2. A surgical instrument for dental use having two pivoted sharpened, tapering blades, triangular in cross-section, the lateral edges of the blades being sharpened and forming cutting edges, as set forth.

CHARLES E. BLAKE, Sr.

Witnesses:
IRA V. HITCHCOCK,
CHAS. J. ARMBRUSTER.